UNITED STATES PATENT OFFICE.

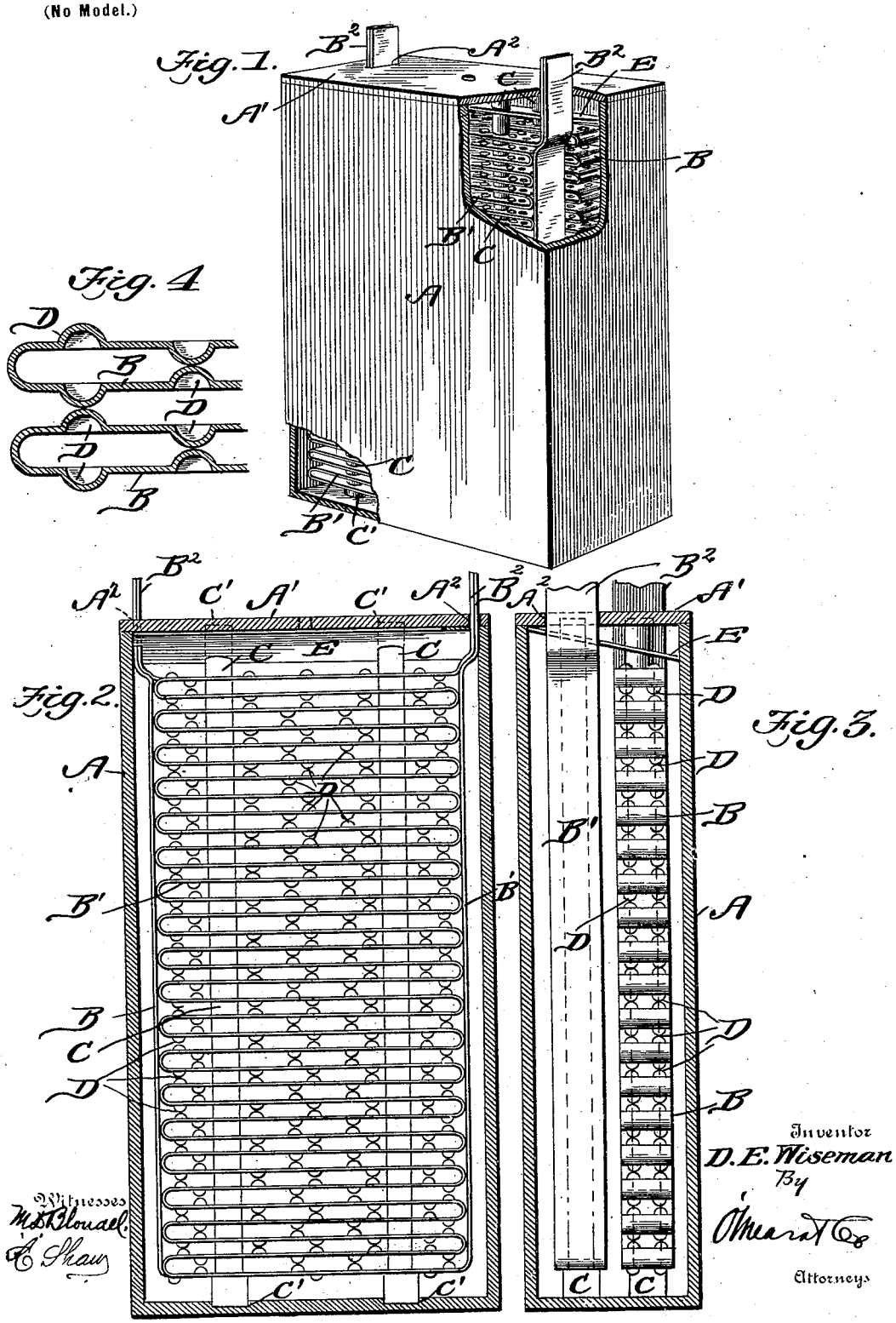

DANIEL E. WISEMAN, OF CHICAGO, ILLINOIS, ASSIGNOR OF TWO-THIRDS TO W. W. VANCE, OF OTTUMWA, IOWA, AND CHARLES V. ASPINWALL, OF CHICAGO, ILLINOIS.

STORAGE BATTERY.

SPECIFICATION forming part of Letters Patent No. 711,710, dated October 21, 1902.

Application filed March 12, 1901. Serial No. 50,884. (No model.)

*To all whom it may concern:*

Be it known that I, DANIEL E. WISEMAN, a citizen of the United States, residing at Chicago, in the county of Cook and State of Illinois, have invented a new and useful Storage Battery or Electrical Accumulator, of which the following is a specification.

This invention relates generally to secondary or storage batteries, and has for its objects to produce a battery which shall be cheap and simple in construction and highly efficient in operation and one in which all tendency of buckling under expansion or contraction is counteracted, one in which a wide range in the rate of charging and discharging is obtained, and one in which the extremity of porosity and lightness without sacrifice to the danger of disintegration is obtained and one in which the actual working surface produces the maximum for a given weight.

With these objects in view the invention consists in the novel features of construction and combination hereinafter fully described, and pointed out in the claims.

In the drawings forming part of this specification, Figure 1 is a perspective view showing the battery constructed in accordance with my invention, portions of the receptacle being broken away to disclose the interior construction. Fig. 2 is a longitudinal sectional view showing the ribbon in elevation. Fig. 3 is a transverse sectional view showing the ribbon in elevation. Fig. 4 is a detail sectional view taken through one or more layers of the lead strips.

In carrying out my invention I employ a suitable receptacle or cell A, which is preferably rectangular in shape and is made of any size and material desired. Arranged within this cell or receptacle are the positive and negative elements B and B', each composed of a thin strip of lead bent back and forth upon itself a number of times intermediate its ends, the ends of each strip being connected and projected above the cell, as shown at B², the top A' of the cell having openings A², through which the terminals of the elements pass. These strips of lead bent as described are arranged side by side and are held in their proper positions by means of rods C, said rods being fixed in sockets C', produced in the bottom of the cell or receptacle and passing upwardly through each turn or bend of the lead strips, there being two rods for each strip, as clearly shown. The upper ends of the rods C are preferably seated in sockets C', produced in the under side of the cover A'. Each lead strip is formed with a series of hemispherical depressions D, which serve a double function—first, to receive the active material, and, secondly, to hold the bends or turns of the lead strip in their proper relative parallel positions. Any suitable electrolyte or exciting liquid may be employed and is poured into the receptacle to a height sufficient to cover all the bends or turns of both the lead strips. A supplemental cover E may be arranged within the cell or receptacle, if so desired, and if so employed it is preferably arranged upon an inclination, as shown, the purpose of said supplemental cover being to prevent slopping over of the electrolytic liquid. By arranging the elements as herein shown the necessity of a separator is avoided, and by constructing and arranging the lead strips in the manner set forth I am enabled to secure a battery of maximum strength with the minimum weight, one which will avoid buckling, and one in which a wide range is obtained in the rate of charging and discharging.

Having thus fully described my invention, what I claim as new, and desire to secure by Letters Patent, is—

1. A storage or secondary battery consisting of two electrodes immersed in a suitable electrolyte and inclosed in a suitable cell, said electrodes being supported upon rods fixed in the cell, said electrodes being composed of a conducting strip or ribbon being bent back and forth upon itself in serpentine form, and said strip or ribbon having a series of depressions produced therein to receive active material.

2. A storage or secondary battery comprising in combination a cell or receptacle having supporting-rods arranged therein, the electrodes arranged side by side within the cell or receptacle, each electrode consisting of a strip of lead bent back and forth upon itself intermediate its ends, the ends of each electrode being united and providing a terminal, the supporting-rods passing through the said bends or turns of each strip, the bent portions of each strip having a series of essentially hemispherical depressions produced therein, the active material arranged in said depressions, the electrolyte, the supplemental cover and main cover, all arranged and adapted to operate, substantially as described.

In testimony whereof I have hereunto subscribed my name this 12th day of February, A. D. 1901.

DANIEL E. WISEMAN.

In presence of—
CHARLES V. ASPINWALL,
RICHD. P. SAUERHERING.